J. F. WILLIAMS.
THERMOSTAT CONTROLLED HEATER.
APPLICATION FILED OCT. 22, 1907.
918,804.
Patented Apr. 20, 1909.
2 SHEETS—SHEET 1.
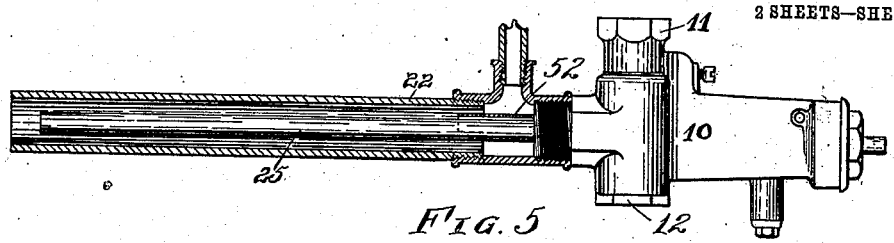
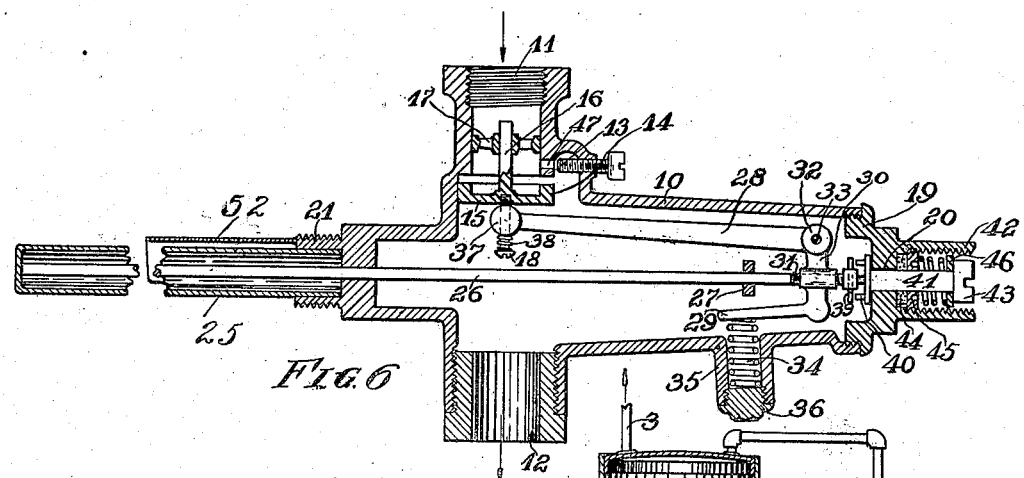
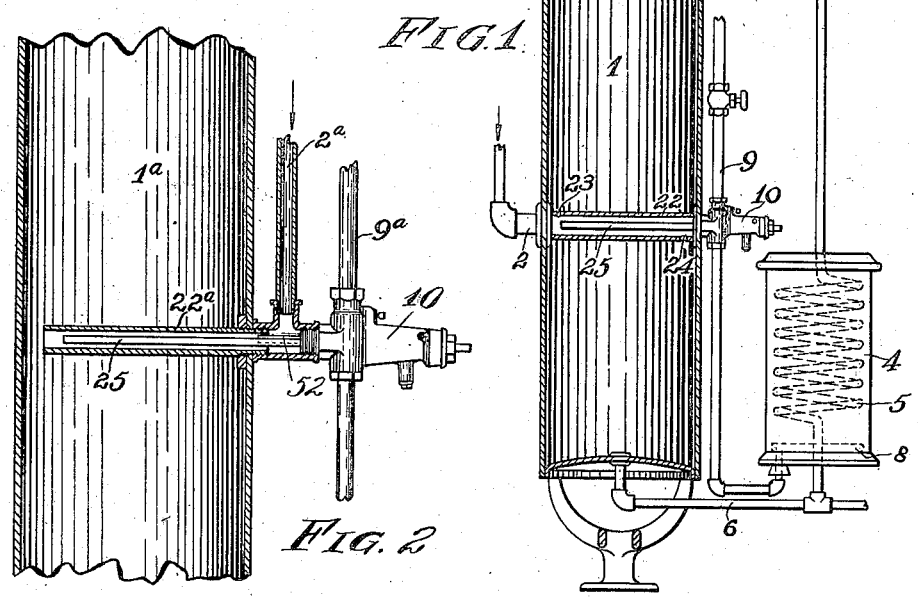
WITNESSES:
INVENTOR,
John F. Williams
By Bates, Fouts & Hull
ATTYS.

J. F. WILLIAMS.
THERMOSTAT CONTROLLED HEATER.
APPLICATION FILED OCT. 22, 1907.
918,804.
Patented Apr. 20, 1909.
2 SHEETS—SHEET 2.
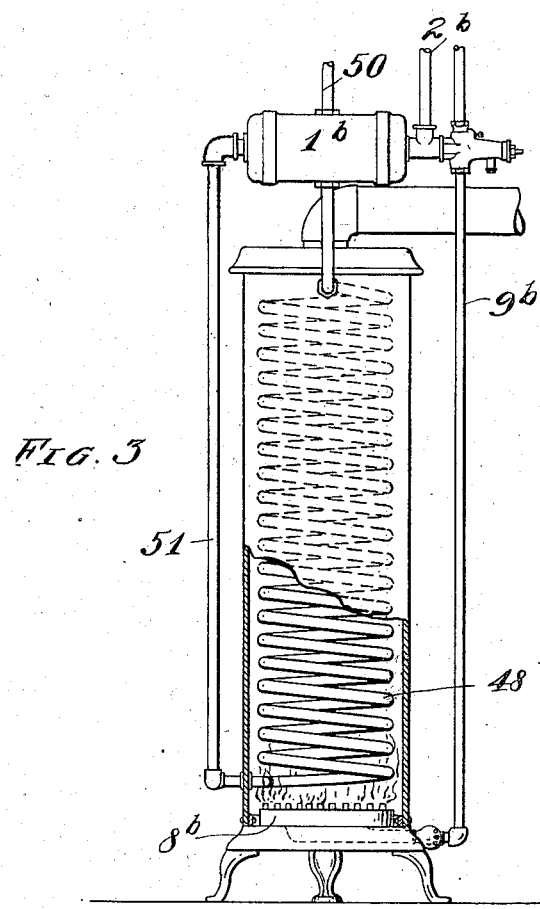
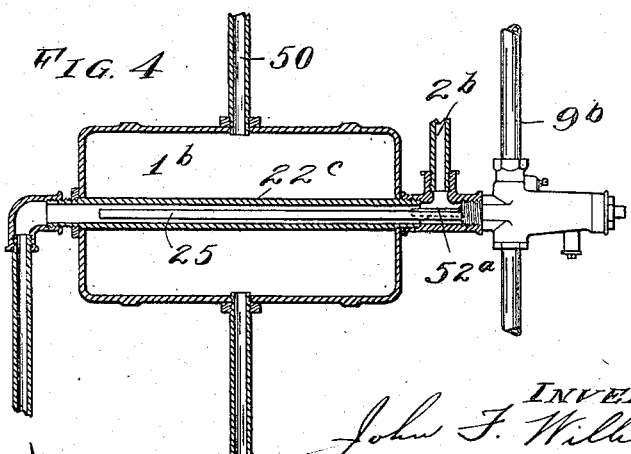

UNITED STATES PATENT OFFICE.

JOHN F. WILLIAMS, OF SANDUSKY, OHIO.

THERMOSTAT-CONTROLLED HEATER.

No. 918,804.　　Specification of Letters Patent.　　Patented April 20, 1909.

Application filed October 22, 1907. Serial No. 398,564.

*To all whom it may concern:*

Be it known that I, JOHN F. WILLIAMS, residing at Sandusky, in the county of Erie and State of Ohio, have invented a certain new and useful Improvement in Thermostat-Controlled Heaters, of which the following is a full, clear, and exact description, reference being had to the accompanying drawings.

This invention relates to water heating apparatus wherein the flow of gas or similar fluid combustible to a burner is controlled by the temperature of the water in a container or receptacle and more especially to an apparatus of this kind wherein the container for the heated water is separate from the receptacle wherein the water is heated.

The objects of my invention are to improve the operation of apparatus of this kind, to so construct and arrange the thermostat which operates the valve by which the fluid fuel is supplied to the burner that the valve shall be opened simultaneously with the opening of a valve or faucet to draw water from the container and shall be closed practically simultaneously with the closing of such valve or faucet.

My invention also relates to an improved form and construction of thermostat and connections whereby the fluid fuel valve may be conveniently operated therefrom and the opening and closing movements of said valve may be conveniently regulated at will to adapt the thermostat for varying temperatures of water.

Generally speaking, the invention may be defined as consisting of the combinations of elements, for the purposes specified, embodied in the claims hereto annexed and illustrated in the accompanying drawings, wherein—

Figure 1 represents a vertical sectional view taken through a water container having my thermostat thereto, the heater for the water in said container being shown in elevation; Fig. 2 represents a sectional view of a modified form of the invention illustrated in Fig. 1; Fig. 3 represents a further modification of my invention, the container being shown as a manifold connected with an "instantaneous" water heater; Fig. 4 represents an enlarged sectional detail of the manifold and the thermostat; Fig. 5 represents a view, partly in section and partly in elevation, of my thermostat; and Fig. 6 represents an enlarged sectional view of said thermostat.

Describing the parts now by reference characters, 1 represents a receptacle or container wherefrom hot water may be drawn to any desired point of use. The receptacle or container shown in Fig. 1 is a stand boiler provided with an inlet connection 2 for cold water and an outlet connection 3 for hot water.

4 denotes the heater, separate from the stand boiler, by means of which the water in said boiler may be heated. This heater comprises a receptacle for water, said receptacle being illustrated as a coil 5, receiving water from the bottom of the stand boiler through pipe 6 and discharging the heated water into the top of the boiler through pipe 7. The coil 5 is provided with a burner 8 for heating the same, said burner receiving its supply from a pipe 9 located at one side of the boiler 1.

10 denotes a casing connected into pipe 9. This casing, as will appear more particularly by reference to Figs. 5 and 6, is provided at the top with an inlet connection 11 and at the bottom with an outlet connection 12. The lower end of inlet connection 11 is faced off within the casing to provide a circular valve seat 13, with which there coöperates a cylindrical valve 14 provided with a head 15. This head is provided with a guide stem 16 cast therewith and adapted to be centered and guided by a spider 17 within inlet connection 11.

18 denotes a screw which is threaded into the central portion of head 15 and which serves as a means for operating the valve.

Casing 10 is elongated and tapers somewhat toward the rear or outer end thereof, such end being closed by means of a head 19 threaded thereinto and provided with a central bore 20, for a purpose to be described hereinafter. The front or inner end of casing 10 is reduced and provided with an external thread 21 for the reception of a tube 22. This tube, in Fig. 1, is shown as projecting within the receptacle 1 and extending horizontally thereacross, forming water tight joints with the opposite sides of the container or receptacle. The inlet connection 2 for cold water communicates directly with the end of said tube which is opposite casing 10 and pipe 9. In the form of my invention shown in Fig. 1, tube 22 is provided with ports 23 and 24 for a purpose to be explained hereinafter.

The thermostat proper comprises a tube 25 of metal, such as copper, having a high coefficient of expansion and a rod 26 of steel or similar metal having a relatively low coefficient of expansion connected at one end to the tube 25 and extending through the inner or front end of casing 10 to the rear or outer end thereof. Tube 25 is conveniently fitted within the nipple 21 at the inner end of casing 10. To prevent sagging or warping of rod 26, guides 27 may be provided within the casing for said rod. The operating lever for transmitting the movements of rod 26 to valve 14 comprises a long arm 28, and a short arm, said short arm comprising two angularly disposed members 29 and 30, one member 29 being substantially parallel with arm 28 and the other being arranged substantially at right angles thereto and provided with an internal thread by means of which the lever is threaded onto a screw 31. The lever is pivoted to the casing at the junction 32 of the long and short arms by a pin 33. Arm 29 is engaged by a spiral spring 34, which is carried within a hollow boss 35 projecting from the casing 10, said boss being closed by means of a nut 36. The free end of arm 28 is provided with a fork 37, which is adapted to be applied to the screw 18, the spiral spring 38 on said screw tending to hold said fork in engagement with the head 15 of valve 14. Screw 32 is provided with a plurality of radial pins 39 adapted to be engaged by pins 40 projecting from the head of a bolt 41, which extends through the bore 20 of head 19. Head 19 is provided with a sleeve 42 which receives the outer end 43 of bolt 31 and also receives the packing 44 around said bolt, said packing being retained in place by a washer 45 threaded into said sleeve. A spiral spring 46 is interposed between head 43 and washer 45.

In assembling, the lever, comprising members 28, 29 and 30, is inserted into the open rear or outer end of casing 10, with screw 31 in place. The fork 37 is brought into engagement with screw 18, pivot pin 33 is inserted in place and spring 34 is placed within boss 35. The head 19 is then secured in place. The end of screw 31 will be in substantial engagement with end of rod 26. Suppose it is desired to have the valve 15 close at a lower temperature than before. The operator applies a screw-driver to the end of bolt 41, pushes inwardly until pins 40 engage pins 39 and turns the bolt in the proper direction to move the screw 30 outwardly. This permits spring 34 to rock the arm 28 upwardly on pivot 33, at an earlier point in the operation of the device and the valve 14 closes when the water in the container is at a lower maximum temperature than before. By rotating bolt 41 in the reverse direction, the opposite result may be obtained.

It will be observed that, in the forms of my invention disclosed in Figs. 1 and 2, the tube which surrounds the thermostat is arranged horizontally and is in free communication with the interior of the container. In Fig. 1, the tube 22 through which cold water is admitted to the container 1 is provided with a port 24 in the bottom thereof and a port 23 in the top thereof. As hot water is drawn from container 1, cold water coming in through inlet 2 immediately comes into contact with and contracts the copper tube 25 and opens the gas valve, supplying gas to the burner 8, said burner, when the valve 14 is closed, having a pilot supply through by-pass 47. The water supplied through tube 22 escapes through port 24. When the faucet is closed through which water is drawn from container 1, the warm water within said container circulates through tube 22 by means of ports 23 and 24, thereby quickly expanding tube 25 and effecting the closing of the gas valve. The result is that the action of the thermostat is substantially simultaneous with the opening and closing of the faucet supplied by pipe 3, the thermostat acting to open the gas valve when a faucet connected with pipe 3 is opened and to close the gas valve when the faucet is closed. The same result will be accomplished by the construction shown in Fig. 2, wherein the inlet 2$^a$ to the container 1$^a$ is connected between the gas pipe 9$^a$ and the body of the container. In this case, cold water entering 2$^a$ flows horizontally along the thermostat tube 25 at once contracting said tube and causing the gas valve to open. As soon as the faucet is closed by means of which warm water is drawn from 1$^a$, the warm water within 1$^a$ is free to enter the horizontal pipe 22$^a$ through the open end thereof and quickly expands the thermostatic tube 25 and closes the gas valve.

In the modification of my invention shown in Fig. 3, the gas supply 9$^b$ is connected with a burner 8$^b$ of a heater of the "instantaneous" type, said heater comprising a coil 48 receiving cold water at the lower end and discharging hot water from the upper end thereof into a container 1$^b$. This container may be made in the shape of a manifold, as shown, and is provided with an outlet connection 50 through which the hot water from the coil below is supplied to the point of use. The same form of thermostat is employed with this heater as in the case with the receptacles shown in Figs. 1 and 2, and the cold water supply 2$^b$ is connected into the pipe 22$^c$ in the same manner as shown in Fig. 2. Pipe 22$^c$ in this case, however, extends entirely across the container 1$^b$ from one end to the other thereof and discharges directly into the pipe 51 which communicates with the bottom of the coil 48. In all of the arrangements, the cold water is caused to flow for substantially the full length of the thermostatic tube 25 and the thermostats are arranged in a horizontal position, whereby they are subjected throughout their extent to water of the same temperature within the container, thereby insuring a much quicker action in closing than would be the case were the thermostat arranged in a vertical position, with the different parts thereof subjected to different temperatures of the water.

By the arrangement shown in Fig. 1, any inconsiderable flow of cold water into the container 1, as in case of a leaky faucet, will not cause the gas valve to be opened, as the cold water will not strike the thermostat tube, as said tube is arranged above the bottom of the tube 22. In the arrangement shown in Figs. 2, 4, 5 and 6, a shield may be provided to prevent the impingement of water on top of the thermostatic tube. Such shields are indicated at 52 in Figs. 2, 5 and 6 and at 52$^a$ in Fig. 4.

My invention as described above, while simple of construction, is durable and particularly efficient in operation and is well adapted to meet all the incidents of use to which it may be subjected.

I claim:

1. In a water heater, the combination of a container for hot water, a burner for heating the water in said container, a pipe for supplying fluid fuel to said burner, a valve in said pipe, a thermostat comprising a horizontally arranged expansible member within said container, connections between said member and said valve, and a cold water supply tube surrounding said member within said container and extending entirely across the same, and connected to opposite sides thereof, substantially as specified.

2. In a water heater, the combination of a container for hot water, a burner for heating the water in said container, a fluid fuel supply pipe leading to said burner, a valve in said pipe, a thermostat comprising a horizontally arranged expansible member within said container, connections between said member and said valve, tubing surrounding said member and extending entirely across said container, said tubing being provided with ports located at the top and bottom thereof, and an inlet for cold water connected with said tube, substantially as specified.

3. In a water heater, the combination of a container for hot water, a heater for the water in said container, a burner for said heater, a fluid-fuel supply pipe for said burner located alongside said container, a valve in said pipe, a thermostat comprising a horizontally-arranged expansible member located within said container and having one end projecting through the container and connected with said valve, and means for supplying cold water to said container, said means comprising a tube surrounding said expansible member and secured to the container wall opposite the point at which said member projects thereinto, and a cold water supply connected with said tube at the side of the container opposite said gas valve, said tube being provided with a discharge port for cold water and with a temperature-equalizing port, substantially as specified.

4. In a water heater, the combination of a container for hot water, a burner for heating the water therein, a pipe for supplying fluid fuel to said burner, a valve in said pipe, a thermostat comprising a horizontally arranged expansible member within said container, a section of tubing surrounding and inclosing said expansible member and located within said container and provided with ports in the top and bottom thereof, and a cold water supply connected to the said tubing, substantially as specified.

5. In a water heater, the combination of a water receptacle, a thermostat therefor, said thermostat comprising an expansible tube adapted to be inserted into the water receptacle and a casing outside of said receptacle, said casing having an inlet and an outlet connection for fluid fuel, a rod connected with said tube and extending longitudinally of said casing, a valve in said casing, a lever for operating said valve, the said lever comprising a pair of arms extending substantially parallel with each other, a rigid connection between said arms, a screw threaded into said rigid connection and adapted to abut against said rod, and a spring adapted to engage one of said arms to force the other into engagement with the valve, substantially as specified.

6. In a water heater, the combination of a water receptacle, a thermostat therefor comprising a tube of expansible material adapted to be inserted into a water receptacle, a rod connected with said tube and projecting outside of said receptacle, a casing surrounding the outer end of said rod, said casing being provided with an inlet and outlet connection for fluid fuel, a valve within said casing controlling the flow of fluid through the inlet connection, and a lever for operating said valve, said lever comprising a long arm, the free end of which engages said valve, and a short arm rigid with the long arm and arranged at an angle with respect to said long arm and adapted to be operated by said rod, substantially as specified.

7. In a water heater, the combination of a water receptacle, a thermostat therefor comprising a tube of expansible material adapted to be inserted into a water receptacle, a rod connected with said tube and projecting outside of said receptacle, a casing surrounding the outer end of said rod, said casing being provided with an inlet and an outlet connection for fluid fuel, a valve within said casing controlling the flow of fluid through the inlet connection, and a lever for operating said valve, said lever comprising a long arm, the free end of which engages said valve, and a short arm rigid with the long arm and arranged at an angle with respect to said long arm, and an adjustable connection between said rod and said short arm, substantially as specified.

8. In a water heater, the combination of a water receptacle, a thermostat therefor comprising a tube of expansible material adapted to be inserted into a water receptacle, a casing outside of said receptacle, said casing having an inlet and an outlet connection for fluid fuel, a valve adapted to control the flow of fluid fuel through said casing, means for operating said valve, said means comprising a lever having a long arm the free end of which is adapted to engage said valve and a short arm rigid with the long arm, an adjustable connection between said short arm and said rod, and a spring tending to retain the free end of the long arm in contact with the valve, substantially as specified.

9. In a water heater, the combination of a water receptacle, a thermostat therefor comprising a tube of expansible material adapted to be inserted into the water receptacle, a rod connected with said tube and projecting outside said receptacle, a casing outside of said receptacle and surrounding the outer end of said rod, said casing having an inlet and an outlet connection for fluid fuel, a valve in said casing adapted to control the flow of fluid fuel therethrough, and means for operating said valve, said means comprising a lever having an arm the free end of which is forked, a pin carried by said valve, and a spring adapted to bear against the head of said pin and against said fork, the lever also having a second arm arranged to be operated by said rod.

10. In a water heater, the combination of a water receptacle, a thermostat therefor comprising a tubular member of expansible material adapted to be inserted into the water receptacle, a casing outside said receptacle, a rod connected with said tube and projecting into said casing, said casing being provided with an inlet and an outlet for fluid fuel, a valve in said casing arranged to control the flow of fluid fuel therethrough, a lever for operating said valve, said lever comprising a long arm and an angular short arm rigidly connected thereto, a spring in said casing adapted to engage one member of the short arm, and an adjustable connection between the other member of the short arm and the rod, substantially as specified.

11. In a water heater, the combination of a water receptacle, a thermostat therefor comprising a tube of expansible material adapted to be inserted into a receptacle, a casing outside of said receptacle, a rod connected with said tube and projecting into said casing, said casing having in the upper portion thereof an inlet for fluid fuel, a vertically movable valve within the casing controlling said inlet, a lever for operating said valve, said lever comprising a long arm extending longitudinally of the casing, said long arm having its free end in engagement with said valve, and a short arm extending substantially parallel with the long arm and connected thereto, a hollow boss in said casing adjacent to the short arm, and a spring in said boss engaging said short arm, substantially as specified.

12. In a water heater, the combination of a water receptacle, a thermostat therefor comprising a tubular expansible member adapted to be fitted to a receptacle, a casing outside of said receptacle, a rod connected with said tubular member and extending longitudinally of said casing, said casing being provided with an inlet for fluid fuel and with an outlet, the rear or outer end of said casing being provided with a removable head, a vertically movable valve controlling the flow of fluid through the casing, a lever adapted to be inserted through the rear or outer end of the casing, said lever having an arm extending longitudinally of the casing and adapted to engage said valve and having a downwardly projecting short arm, a screw threaded into the downwardly projecting short arm and adapted to engage said rod, and means carried by said head adapted to engage said screw for rotating the same and thereby adjusting the position of the lever with respect to the valve and the rod, substantially as specified.

13. In a water heater, the combination of a water receptacle, a thermostat therefor comprising a tubular member of expansible material adapted to be inserted into a receptacle, a casing outside of said receptacle, a rod connected with said tube and projecting longitudinally of said casing, said casing having an inlet connection in the upper portion thereof and an outlet connection, a valve controlling said inlet connection, and means for operating said valve, said means comprising a lever pivoted adjacent to the rear or outer end of the casing and having an arm adapted to engage said valve and having a second arm arranged transversely of said casing and provided with a screw threaded therethrough and adapted to engage the outer end of said rod, and means for operating said screw from the outside of said casing, said means comprising a sleeve projecting from the rear end of the casing, an operating member reciprocable in said sleeve and having at its inner end means for engaging said screw, and a spring arranged to normally hold said member out of contact with said screw, substantially as specified.

14. A thermostat for water heaters comprising a tube of expansible material adapted to be inserted into the water receptacle and a casing outside of said receptacle, a rod connected at its inner end to said tube and projecting through said casing nearly to the rear end thereof, said casing being provided with an inlet connection in the upper end thereof and with an outlet connection, an upwardly-seating valve for said inlet connection, a lever for operating said valve, said lever having projecting from the pivot thereof a long arm and an angular short arm, said short arm comprising a vertical branch arranged adjacent to the rear end of the casing and a substantially horizontal branch adjacent to the bottom of the casing, an adjusting screw extending through the vertical branch and adapted to engage said rod, a spring seated within the lower portion of the casing and adapted to engage the horizontal branch, and means whereby said screw may be adjusted, substantially as specified.

15. In a water heater, the combination of a water receptacle, a thermostat therefor comprising a tubular member of expansible material adapted to be inserted into a receptacle, a casing outside of said receptacle, a rod connected with said tube and projecting longitudinally of said casing, said casing having an inlet connection and an outlet connection, a valve controlling said inlet connection, and means for operating said valve, said means comprising a lever pivoted adjacent to the rear or outer end of the casing and having an arm adapted to engage said valve and having a second arm arranged transversely of said casing and provided with a screw threaded therethrough and adapted to engage the outer end of said rod, said screw being provided with projections, and means for operating said screw from the outside of said casing, said means comprising a reciprocable operating member projecting through the rear end of the casing and having at its inner end means for engaging said projections, and a spring arranged to normally hold said member out of contact with said screw, substantially as specified.

16. In a water heater, the combination of a container for hot water, a fluid fuel burner arranged to heat the water in said container, a valve for controlling the supply of fluid fuel to said burner, a thermostat member in said container, connections whereby said member may operate said valve, and means for supplying water to said container, said means comprising a tube section surrounding said member, the parts being arranged to prevent the impingement of the inflowing water against the member when the water supply is limited.

17. In a water heater, the combination of a container for hot water, a fluid fuel burner arranged to heat the water in said container, a valve for controlling the supply of fluid fuel to said burner, a thermostat comprising a horizontally arranged expansible member which is located within said container, and means for supplying water longitudinally of said expansible member, the parts being arranged to prevent the impingement of the inflowing water against the expansible member when the water supply is limited, substantially as specified.

In testimony whereof, I hereunto affix my signature in the presence of two witnesses.

JOHN F. WILLIAMS.

Witnesses:
  J. B. HULL,
  BRENNAN B. WEST.